United States Patent
McMeekin

(10) Patent No.: US 6,272,751 B1
(45) Date of Patent: Aug. 14, 2001

(54) BEARING ASSEMBLY AND MANUFACTURING METHOD

(75) Inventor: Kenneth Macleod McMeekin, Ayrshire (GB)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/355,641

(22) PCT Filed: Jan. 22, 1998

(86) PCT No.: PCT/GB98/00199

§ 371 Date: Jul. 28, 1999

§ 102(e) Date: Jul. 28, 1999

(87) PCT Pub. No.: WO98/32984

PCT Pub. Date: Jul. 30, 1998

(30) Foreign Application Priority Data

Jan. 29, 1997 (GB) .................................................. 9701777
Nov. 4, 1997 (GB) .................................................. 9723152

(51) Int. Cl.⁷ .................................................. B21D 53/00
(52) U.S. Cl. .................................................. 29/898.054
(58) Field of Search .................... 384/297; 29/898.054, 29/898.055, 898.056, 898.057, 898.058, 898.059

(56) References Cited

U.S. PATENT DOCUMENTS

| | | | |
|---|---|---|---|
| 4,538,929 | 9/1985 | Ehrentraut et al. | 384/120 |
| 4,774,749 | 10/1988 | Furumura | 29/149.5 NM |
| 5,129,739 | 7/1992 | Asai et al. | 384/292 |

FOREIGN PATENT DOCUMENTS

| | | | |
|---|---|---|---|
| 2073172 | 9/1971 | (FR) | F16C/17/00 |
| 2214063 | 7/1974 | (FR) | F16C/33/20 |
| 1 338 234 | 11/1973 | (GB) | F16C/33/20 |
| 1 454 385 | 11/1976 | (GB) | F16C/33/20 |
| 56011225 | 2/1981 | (JP) | B29C/27/16 |

OTHER PUBLICATIONS

Bartz et al.; Selbstschmierende und wartungsfreie Gleitlager, pp. 289–299 (1995).
INA Permaglide Plain Bearings 701GB issued by Karl Schmidt GmbH, 1983.

*Primary Examiner*—Lenard A. Footland
(74) *Attorney, Agent, or Firm*—Rader, Fishman & Grauer PLLC

(57) ABSTRACT

A dry bearing ($10_2$, FIG. 2(*f*)) for a hinge pin or the like comprises a bush $40_2$ mounted in a radially supportive housing (16), the bush being formed by a circumferentially discontinuous tubular form made by rolling a strip of steel-backed, bearing material having a filled polymer infiltrated sintered bronze (ISB) lining about a mandrel (FIG. 32, 2(*c*)). The tubular form is, after mounting and to provide a more uniform inside diameter, burnished by pushing therethrough a burnishing tool (50), having a cylindrical portion (51), of larger diameter than the mounted form. The bearing (and method of manufacture) differ from the art in that a minor part of the lining surface is, prior to passage of the burnishing tool and conveniently when still in strip form, compressed in part as depressions (troughs $44_2$) arrayed over the surface. Such depressions permit burnishing with a less oversize tool to get said uniform inside diameter, thereby requiring less work in driving the tool and with less risk of shearing the lining components and damaging the surrounding housing with radial pressure during burnishing.

18 Claims, 4 Drawing Sheets

Figure 2A:
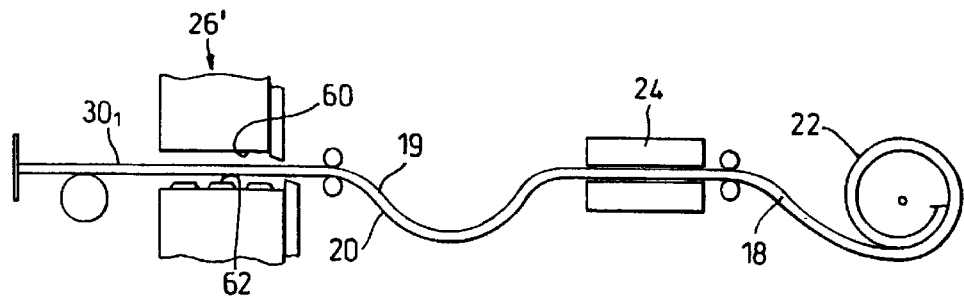

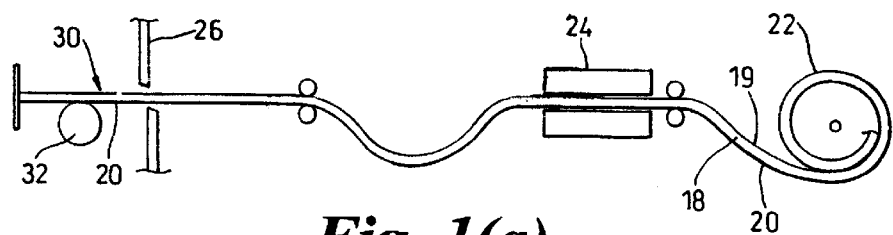
Fig. 1(a)
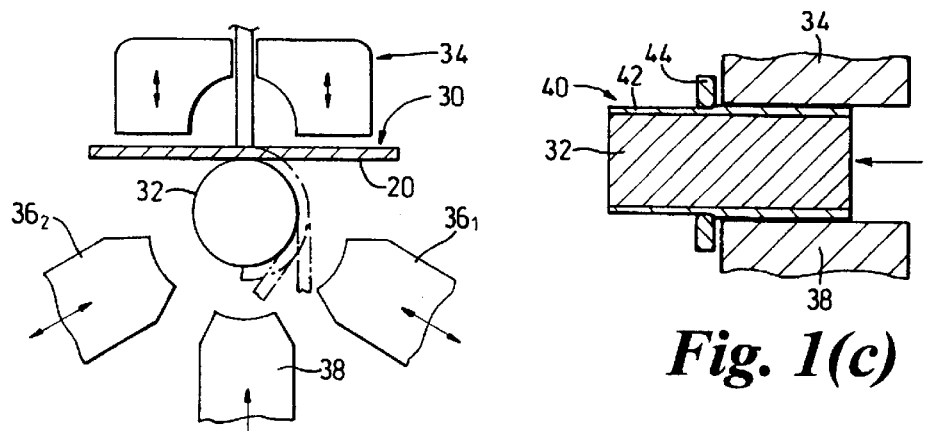
Fig. 1(b)
Fig. 1(c)
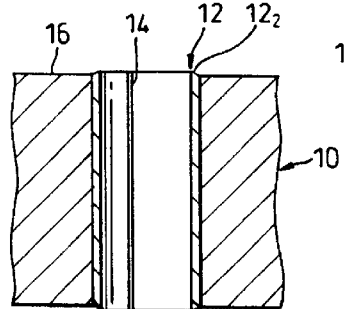
Fig. 1(d)
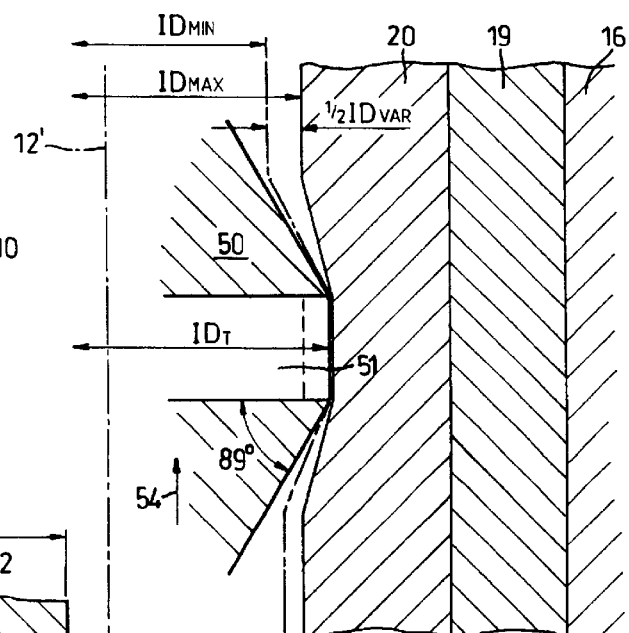
Fig. 1(f)
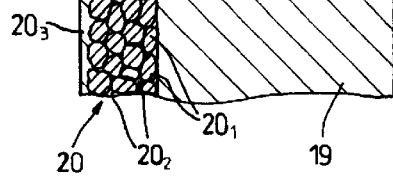
Fig. 1(e)

BEARING ASSEMBLY AND MANUFACTURING METHOD

This invention relates to bearing arrangements in the form of cylindrically tubular bushes or cylindrically part tubular shells mounted against radial expansion and in particular relates to such arrangements in which the bush or shell comprises a plastically deformable and ductile lining material comprising or including a low friction polymer-based material and fillers, referred to hereinafter as a filled polymer, that is compressible in the sense of being less than fully dense before compression. Such a filled polymer based bearing material is, in the following description and claims, referred to as "filled polymer compressible lining".

The invention is particularly, but not exclusively, concerned with such bearing arrangements in which the filled polymer compressible lining is defined by a filled polymer infiltrated into a sponge-like sintered metal matrix to form the lining material, which matrix may itself be carried on a backing strip of solid metal, such as steel or bronze or like material commonly used as a backing material in bearing applications. It is known to form bearing arrangements in which the sintered metal matrix is bronze and such lining material is herein referred to as 'filled polymer infiltrated sintered bronze' or 'FPISB' for short, and as 'backed filled polymer infiltrated sintered bronze' or 'BFPISB' for short, respectively.

Such BFPISB is manufactured and sold by the Applicant with various low friction polymer materials and filled with different combinations of fillers. For example, the material known as DU has a polymer base of PTFE with lead filler and is described in patent specification no GB-A-2172296, the material known as DP which has a polymer base of PTFE and zinc and fine bronze instead of lead and is described in patent specifications no GB-A-2248238, the material known as DP4 which has PTFE with fillers of calcium fluoride and fibrillated Kevlar (RTM) and is described in patent specification no GB-A-2279998, and the material known as DU (B) which has the same lining material and bronze sinter as DU but a bronze backing instead of steel. The above is not an exhaustive list, and bearing bushes and shells of such bearing material are employed, for example, in vehicle door hinges to support a rotatable hinge pin and in suspension components to support reciprocating rods, both in rotational and rectilinear motion.

A typical steel backed, filled polymer infiltrated bronze bearing material is formed as a laminar strip manufactured by depositing bronze powder onto a steel backing, heating the combination to sinter point to develop a sponge-like bronze matrix layer, depositing a solvent-borne paste or mush of the low friction polymer and fillers, rolling to infiltrate it within the interstices of the bronze layer and again heating the combination to dry and sinter the filled polymer so that it completely impregnates the bronze sinter matrix. It is a feature of such manufacture that the filled polymer not only infiltrates the interstitial spaces between the partially fused bronze particles (leaving only about 1% porosity) but also forms a relatively thin skin overlying them. Depending upon the eventual use of the bearing arrangement an amount of filled polymer may be used that causes such skin to exist in a thickness of 0.010 mm to 0.04 mm. Such structure is sometimes described in terms of the polymer skin being an overlay that is intimately bonded to a substrate provided by the fused metal particles, the substrate being itself intimately bonded to a backing strip where appropriate.

In a typical manufacture, tubular bush bearings are formed by deforming or bending a laminar plate-like blank, cut from such strip, around a cylindrical mandrel into a longitudinally slit tubular form having the ISB lining innermost. The tubular form, which is of course circumferentially discontinuous and unstable against radial forces, is thereafter mounted within a radially stronger housing for reception of hinge pin or like cylindrical object to be borne thereby.

It will be appreciated that in the manufacture of the tubular bush form there will be variations in dimensions, particularly the inside and outside diameters thereof as defined by the mandrel diameter and strip thickness, and that furthermore the variations will be exacerbated when the tubular form is finally mounted within a separately manufactured housing that is itself subject to manufacturing tolerances.

Whereas a bush having a conventional bearing metal lining or homogeneous (incompressible) polymer can be manufactured to have an undersized inside diameter and have lining surface material removed by a reaming tool or the like to achieve a desired nominal inside diameter, it is not readily possible to provide inside diameter accuracy for, in particular, an ISB bearing by removing lining material.

To more clearly illustrate the steps involved in production of such a known bush bearing arrangement having an ISB lining and understand constraints placed upon achieving dimensional accuracy, reference is made to FIGS. 1(a) to 1(f), the bush and its manufacture being known in the art and briefly described here as an aid to understanding the invention.

Referring to FIG. 1(d), a bearing arrangement 10 is defined by a tubular bush form 12 that has a circumferential discontinuity 14 and is mounted within a radially constraining housing 16. Referring also to FIG. 1(a) a laminar strip 18 of steel backed ISB bearing stock, having steel backing 19 and ISB lining 20, manufactured as outlined above and with a width corresponding substantially to the desired bush length, is pulled from a coil 22 and at a trimming station 24 its edges are trimmed by chamfering to prepare the eventual bush ends $12_1$ and $12_2$. The strip is fed to a blanking station 26 at which a predetermined length is a cropped to form a plate or blank 30. The cropped blank is positioned with the ISB surface 20 adjacent a cylindrical mandrel 32 that has a circular cross section of predefined diameter. Referring also to FIG. 1(b), a first ram 34 clamps the blank to the mandrel and bends the blank about the mandrel into a U-shape, thereafter a pair of second rams $36_1$ and $36_2$ close it around the mandrel into substantially tubular form before a third ram 38 applies pressure to the ends of the strip, the rams in unison pressing the blank against the mandrel to effect tubular uniformity with the mandrel so that the erstwhile opposite ends of the blank meet as a circumferential discontinuity of the tubular form. Referring also to FIG. 1(c), the tubular form, indicated generally at 40, therefore has its tubular wall, conveniently identified as 42, corresponding substantially to the thickness of the BISB 18. The tubular form 40, still held closed on the mandrel is displaced with the mandrel through a die 44 which defines or gauges the outside diameter of the tubular form and, relative to the mandrel, the thickness of the tubular wall 42. Any changes in wall thickness necessary to permit it to pass through the die are the result of elongation or drawing of the radially confined components of the wall which retain their relative thicknesses, although there may be a certain amount of recovery of wall thickness as the materials leave the die. The mandrel is thereafter withdrawn from the tubular form to leave the bush.

The structure of the wall on an enlarged scale is illustrated in FIG. 1(e), illustrating not only backing strip 18 and ISB 20 but also within the ISB the sintered bronze matrix $20_1$, filled polymer $20_2$ and the polymer surface layer $20_3$.

As a consequence of the circumferential discontinuity 14, the bush 40 is relatively weak against radial forces and it is mounted for use within an encircling housing 16 to comprise the aforementioned bearing arrangement 10.

As discussed above, manufacturing tolerances in respect of BISB strip thickness and the operations associated with forming of the bush on the mandrel and gauging or defining wall thickness prior to removing it from the mandrel give a distribution of inside diameter values and, to a lesser extent, wall thickness (and thus outside diameter) values each within a range, conveniently called herein a variation range. By way of example, in manufacturing a bush of the order of 20.00 mm inside diameter from bearing stock 18 of some 1.5 mm overall thickness (comprising steel backing 19 of 1.2 mm thickness and ISB layer 20 of some 0.3 mm thickness), the internal diameter of the tubular form may be distributed within an industrially reproducible manufacture in a variation range of 0.04 mm or thereabouts, that is, having a maximum inside diameter $ID_{MAX}$ greater than minimum inside diameter $ID_{MIN}$ by a variation $ID_{VAR}=ID_{MAX}-ID_{MIN}=$ approx 0.04 mm, and a variation range of wall thickness of 0.01–0.02 mm.

This degree of dimensional accuracy in inside diameter of the bush per se may be considered marginally acceptable in respect of receiving an elongate member to be borne by the bush, but it is found that as a result of mounting such bush within the separately manufactured housing, which may itself have a distribution of inside diameters, the effective $ID_{VAR}$ for the assembled bush may be greater than 0.08 mm.

As also discussed above, the ISB bearing surface precludes reaming of an undersized bush to the desired inside diameter by removal of excess lining material. However, the ISB material is amenable to so-called burnishing by running through the mounted bush a hard, smooth body of diameter greater than the maximum inside diameter of the mounted bush, which body applies radial pressure to the wall by way of the lining surface and, in a manner analogous to the above-described gauging of the outside diameter of mandrel-borne bush by a surrounding die, effects a reduction in overall wall thickness by drawing or causing the wall components to flow lengthways of the bush within the radially inexpansible housing, similarly maintaining their relative thicknesses.

Referring to FIG. 1(f), a fragment of the arrangement of FIG. 1(d) is shown schematically on an enlarged scale along with a fragment of, a burnishing tool 50 which has a body formed from a rod of tool steel hardened and tempered to 58–62 ARC, the rod comprising a slight bi-conical taper (shown greatly exaggerated) of about 1° at end regions separated by a cylindrical central portion 51 having a length less than the bush, typically 20% of bush length. In respect of burnishing such a smooth bore bush the burnishing tool has a cylindrical diameter that exceeds $ID_{MAX}$ by about 30–50% of $ID_{VAR}$.

By way of example, bearing arrangements were produced from a sample number of bushes formed as described above which exhibited inside diameters varying between 20.00 and 20.05 mm, that is, with an $ID_{VAR}$ of about 0.050 mm. The burnishing tool 50 had a nominal cylindrical diameter of 20.072 mm (in the range 20.070 to 20.075 mm that represents the tolerance of tool diameter), that is, exceeding $ID_{MAX}$ by about 45% of $ID_{VAR}$. The burnishing tool was pushed through the mounted bush in the direction of arrow 54 and, as illustrated in a schematic way, with the steel backing 19 supported by the housing 16, the cylindrical portion of the tool applied local radial pressure to the BISB 20 which is compressed between the tool and lining.

Apart from any marginal degree of porosity of the lining material 20, it is essentially incompressible and behaves homogeneously so that passage of the tool requires a thinning of the wall 42 as a whole by flow of all of the components axially; such thinning retains the relative thicknesses of the component layers of the wall and comprises a mixture of plastic deformation wherein the bush is elongated permanently and elastic deformation whereby the wall regains some of its thickness after the tool has passed, principally due to the backing being deformed well within its elastic limits of the steel. The inside diameter after burnishing is a function of the extent to which the diameter of the burnishing tool exceeds the inside diameter of the unburnished bush and the recovery (which is itself a function of the degree of compression that is related to the excess of the total diameter), but in this example, and as seen from the Figure, the after-burnishing inside diameter distribution between $ID_{BMIN}$ and $ID_{BMAX}$ ($=ID_{BVAR}$) was less than before burnishing and typically to the level of variation achieved for the bush manufacture per se eliminating the additional variation due to mounting in the housing; typically, for $ID_{VAR}=0.050$ mm, $ID_{BVAR}=0.025$ mm.

However, there are a number of difficulties and limitations attached to implementing such burnishing technique. Because of the nature of the lining material it is only possible to effect an increase in the inside diameter of such a mounted bush by reducing the overall thickness of the wall which, as is seen from the above description is manifested as an elongation of the bush by 'flow' of the components of the wall in response to the radial compression exerted by the burnishing tool. However, the deformation of the bush wall, which comprises largely the steel backing strip, is governed by the behaviour of the steel which, for a relatively small extension envisioned in this situation, exhibits a non-negligible, and unpredictable, degree of recovery. That is, the diameter of the burnishing tool has to be sufficiently large in relation to the initial inside diameter that it causes greater deformation of the bush wall than is really required in order to allow for this recovery. This greater deformation not only requires an energy input which is larger than the final change suggests but also that level of initial deformation/energy input is limited by the level at which the accompanying longitudinal forces begin to shear the polymer material from the lining. Thus, in respect of applying such burnishing to known mounted bushes of constant wall thickness, not only is a considerable amount of energy wall deformation required to push the burnishing tool through the bush but that the recovery in wall thickness thereafter represents a continued uncertainty in respect of final inside diameter and together they limit the extent to which the wall can be deformed to effect a specific increase in inside diameter.

Furthermore, the radial pressure resulting from such driving force and compression may, in some cases, be too great for the strength of the housing which may cease to give support to the bush. As the mounting of the bush may have to be effected at its point of use rather than in circumstances given over to bush manufacture, such burnishing of the mounted bush may therefore also have to be effected near the point of eventual use, where conditions are not conducive to such difficulties as may accompany use of the burnishing tool.

Although the above discussion has concentrated upon tubular bushes and bearing arrangements in which the tubular bush form is retained when mounted, that is, wherein the bearing is circularly sectioned and substantially fully cylindrical, it will be appreciated that such mounted bush bearings may be divided longitudinally into discrete arcuate shells which are mounted for radial support and used singly or as a pair, that is, a circularly sectioned, but only part-cylindrical bearing. The inside diameter dimension of a shell or pair of shells may be established whilst in tubular bush form before division or, for a pair of shells, after mounting with respect to each other into a bush-like tubular form, so that the technique of burnishing a tubular form mounted in a radially constraining housing may be considered applicable to shell-type ISB bearings as for tubular bush ISB bearings.

Also the structures and techniques are applicable to lining materials comprising the various filled polymers that are compressible and suitable for such lining use and/or without a solid metal backing.

Such lining structures and burnishing method provide a starting point for the present invention, and it is an object of the present invention to provide a method of manufacturing a circularly sectioned bearing having a burnished, radially supported filled polymer compressible lining with improved dimensional tolerance and ease of manufacture than hitherto, and a circularly sectioned, burnished tubular bush bearing arrangement and associated burnishing tool for such manufacture.

It is also an object of the present invention to provide a circularly sectioned bush form, having a filled polymer compressible lining, suitable for mounting surrounded by a radially constraining housing and then having its inside diameter defined by a burnishing tool when mounted, that permits easier passage of a burnishing tool and exhibits greater dimensional accuracy resulting from such passage. It is furthermore an object of the present invention to provide a substantially laminar bearing material having a lining filled polymer compressible and suitable for bending to form such a circumferentially discontinuous bush.

According to a first embodiment of the present invention a method of making a circumferentially sectioned bearing having a burnished, radially supported filled polymer compressible lining comprises (i) defining a tubular form, of which the filled polymer compressible lining presents a bearing surface extending about, and facing inwardly towards, a longitudinal axis, having an internal diameter smaller than the desired internal diameter of the bearing, (ii) mounting the tubular form in a radially restraining housing to define a mounted form, and (iii) increasing the internal diameter of the mounted form to said desired internal diameter by passing therethrough a burnishing tool, having a cylindrical portion of length less than the length of the tubular form and diameter in excess of the desired internal diameter of the bearing and operable to effect by said passage compression of the filled polymer compressible lining in a direction substantially perpendicular to the surface, and is characterised by the step of, prior to passage of a said burnishing tool through the mounted bush form, effecting at least a partial compression of a minor part of the filled polymer compressible lining as a plurality of depressions in said bearing surface of the mounted tubular form, distributed over the surface.

According to a second embodiment of the present invention a bearing bush arrangement comprises (i) a circularly sectioned tubular bush form surrounding a longitudinal axis and manufactured with an outside diameter dimensional to locate within a radially outwardly constraining housing and an internal diameter less than that desired of the bearing bush arrangement said manufactured internal diameter being defined by a bearing surface of filled polymer compressible lining facing radially inwardly towards said longitudinal axis, and (ii) an associated burnishing tool, adapted to be passed through the housed tubular form along said longitudinal axis and having a cylindrical portion of diameter in excess of the desired internal diameter of the bearing bush arrangement, the arrangement being characterised in that said tubular bush form is manufactured to have, prior to passage of the burnishing tool therethough, said lining partially compressed over a minor part of the bearing surface as a plurality of depressions distributed over the surface.

According to a third embodiment of the present invention a bearing material comprises a substantially laminar, bendable strip having a bearing surface defined by a filled polymer compressible lining and wherein a minor part of the lining is partially compressed as a plurality of depressions distributed over the surface.

Figure 2B:
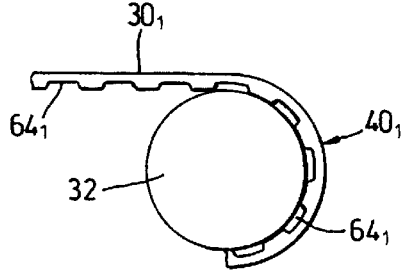
Figure 2C:
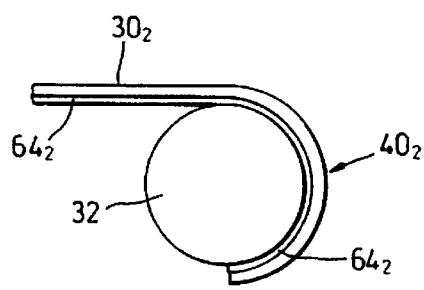
Figure 2D:
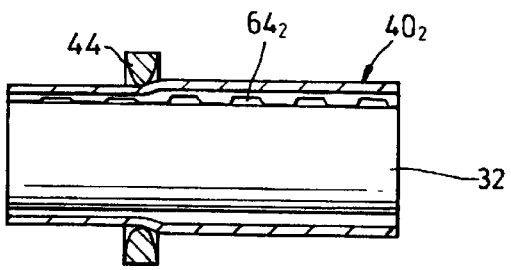
Figure 2E:
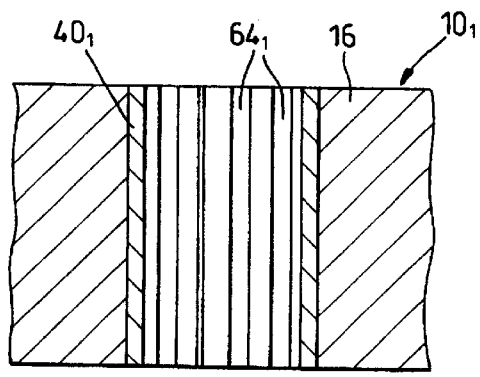
Figure 2F:
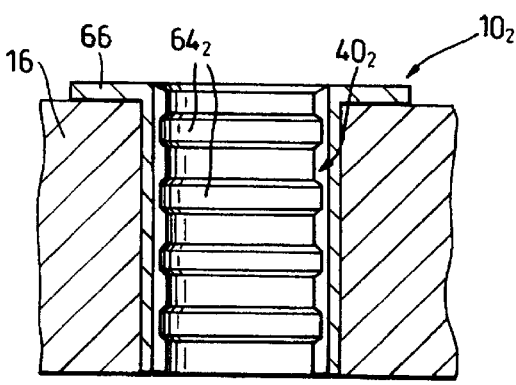
Figure 2G:
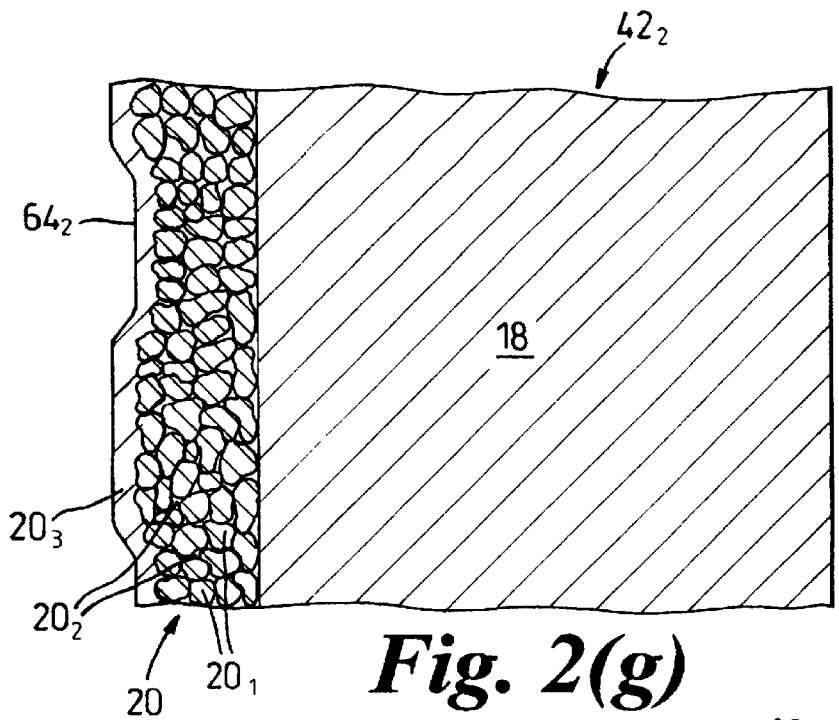
Figure 2H:
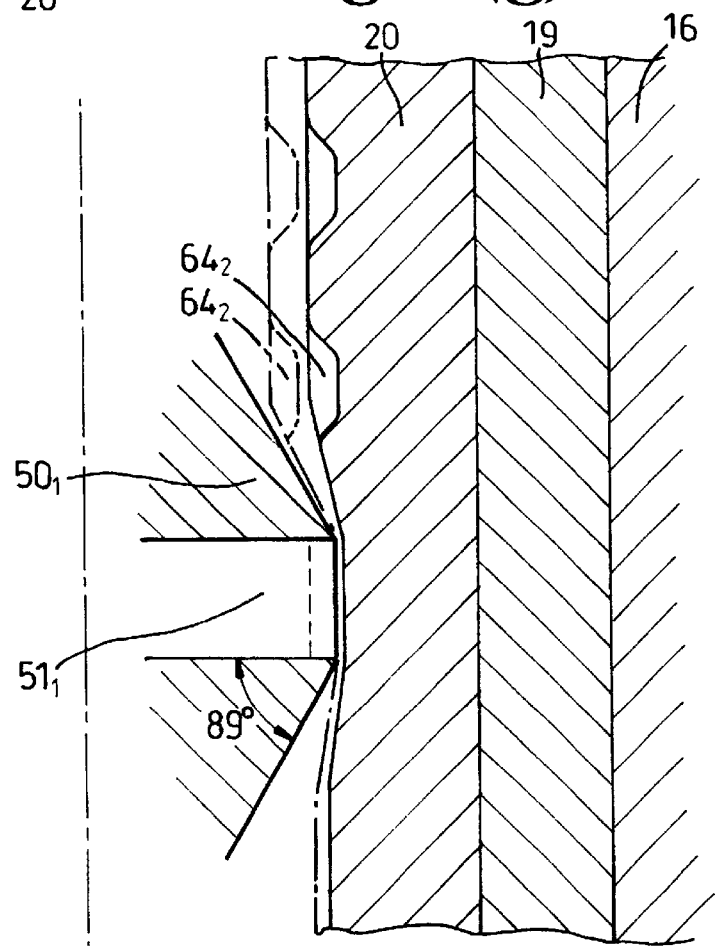
Figure 2I:
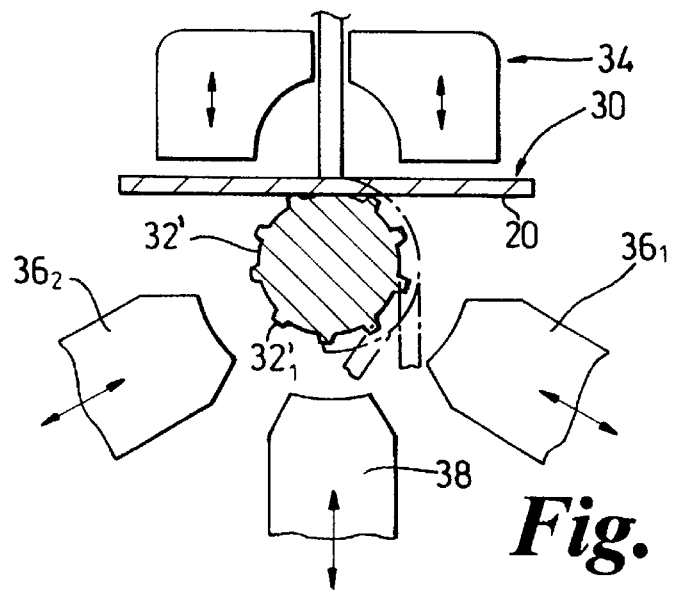
Figure 3A:
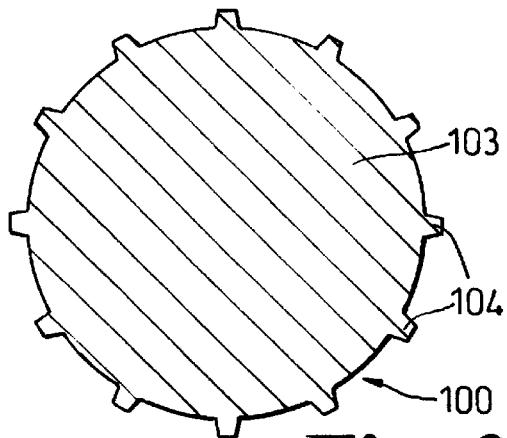
Figure 3B:
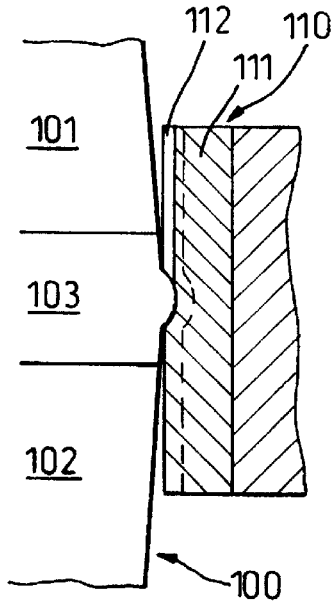
Figure 4:
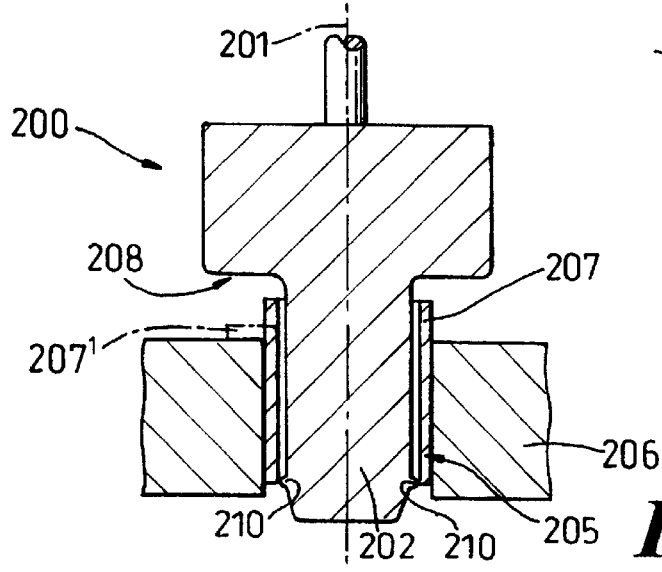

Embodiments of the invention will now be described by way of example with reference to the accompanying drawings, in which FIG. (1a) described above is a schematic side view of a blank cutting station of a known arrangement for forming bearing bushes, for deriving from a continuous strip of steel backed ISB stock a succession of rectangular, substantially flat blanks, FIG. 1(b) is a schematic end view of a bending station associated with the arrangement of FIG. 1(a) illustrating how each blank is bent around a mandrel and pressed radially into a circumferentially discontinuous tubular bush form, FIG. 1(c) is a schematic sectional elevation through the mandrel and tubular form of FIG. (1b) illustrating how the tubular form is removed from the mandrel by way of a die to define the outside and inside diameters of the tubular bush, FIG. (1d) is a sectional elevation through a bearing arrangement comprising the tubular bush form of FIG. 1(c) mounted enclosed within a radially constraining housing, FIG. (1e) is a schematic cross sectional view through the wall of the bush form of FIG. 1(d) illustrating the components of the wall and relative thicknesses of the components, FIG. 1(f) is a schematic representation of fragment of the arrangement of FIG. 1 (d) on an enlarged scale illustrating the passage of a burnishing tool therethrough, FIG. 2(a) is a detail of a cutting station similar to that of FIG. 1(a) but modified in accordance with the present invention to emboss an array of depressions in the form of a series of parallel troughs in the ISB lining simultaneously with cropping of the blank from the continuous strip, FIG. 2(b) is an end view, similar to FIG. 1(b), but of such an embossed blank in relation to the mandrel and (in part) bent into a tubular form, such that the troughs run between opposite ends of the tubular form, FIG. 2(c) is an end view, similar to FIG. 2(b) but in which the troughs run orthogonally and between the edges of the blank that form the circumferential discontinuity, FIG. 2(d) is a sectional elevation similar to FIG. 1(c) but showing the tubular bush form of FIG. 2(c), FIG. 2(e) is a sectional elevation through a bush bearing arrangement comprising the tubular bush form of FIG. 2(b) enclosed within a radially constraining housing, illustrating the trough depressions which extend longitudinally of the bush bearing, FIG. 2(f) is a sectional elevation similar to that of FIG. 2(e) but showing an alternative bush form, having a radially extending flange and pressed troughs in accordance with FIG. 2(c) which extend transversely to the longitudinal direction, FIG. 2(g) is a greatly enlarged section through a fragment of the wall of the bush form of FIG. 2(f) prior to burnishing illustrating the ISB structure in the vicinity of a trough depression, FIG. 2(h) is a fragment of the arrangement of FIG. 2(f) on an enlarged scale illustrating the passage of a burnishing tool therethrough, FIG. 2(i) is an end view, similar to FIG. (a) in which an unembossed blank is shown in part bent into tubular form about a mandrel having raised projections arrayed about its periphery press said troughs in the lining surface as the blank is bent into tubular form, FIG. 3(a) is a cross section through a depressing tool for forming elongate troughs in a mounted bush form in a further method in accordance with the present invention, FIG. 3(b) is a sectional elevation through a part of the depressing tool of FIG. 3(a) illustrating also its passage through a mounted tubular bush form and the formation of elongate troughs in the lining thereby, and FIG. 4 shows in sectional elevation a modification of the method and depressing tool of FIG. 3(b), namely incorporation of the depressing tool with a flanging tool for forming a flange at one end of a tubular bush form that is mounted for radial support over part only of its length and adaptation of the guide spigot of such flanging tool as a depressing tool thereof to effect elongate troughs in the surface of the bush form by passage of the spigot.

Referring now to FIGS. 2(a) and 2(b), in accordance with the present invention the method of manufacturing a bush bearing is generally similar to that described above and where it is the same identical reference numbers are used. The blank forming apparatus uncoils and edge trims the steel backed ISB 18 but in blanking station 26' the length of strip comprising the blank plate is not only cropped from the strip by a stamping action but is also compressed between a flat supporting surface 60 adjacent the backing 19 and a profiled embossment surface 62 adjacent the filled polymer compressable lining material (ISB) 20, whereby an array of depressions are indented in the lining surface. In forming the depressions the embossment surface compresses the lining material, initially eliminating any porosity within the filled polymer before effecting a compression or consolidation of the sinter matrix, displacing polymer therefrom in to adjacent regions of the lining and leaving polymer skin or overlay of slightly increased thickness. The depressions are formed as a one-dimensional array of elongate troughs $64_1$ each extending across the surface of the blank from edge to edge. The troughs are uniformly spaced and each has a width no greater than the lining surface between troughs, (conveniently referred to as the inter-depression surface), conveniently having a width about 66% of the inter-depression distance. The depth profile of each trough is open to variation, but it is essential that any 'corners' of the profiled lining surface created in forming the depressions are radiused to an extent that inhibits the formation of shear stress concentrations in the lining during subsequent operations.

The depths and other dimensional relationships of the trough depressions are open to variation and are discussed hereinafter. However, the trough depressions are preferably formed to a depth less than 25% of the ISB lining thickness to avoid the above-discussed detrimental effects on its performance that result from over compression of the ISB lining, the actual trough depth being chosen with regard to the variations in inside diameter of the bush due to manufacture and mounting and to the required inside diameter of the bush bearing in relation to the nominal inside diameter of the bush form per se.

Referring particularly to FIG. 2(b) the profiled cropped blank, indicated at $30_1$ in the left hand part of the Figure, is bent around and pressed against mandrel 32 into a tubular form, as shown in the right hand half of the Figure, by the same ram arrangement described with reference to FIG. 1(b), from which it will be seen that the troughs extend axially along the uneven wall of the tubular bush form. Referring also to FIG. 2(c), it will be seen that the depressions may be formed in blank $30_2$ at the cropping station 26' as troughs $64_2$ running from edge to edge along the length of the blank so that when the blank is bent around mandrel 32 into bush form $40_2$ the troughs extend between the adjacent edges that form the circumferential discontinuity.

Referring also to FIG. 2(d), which for ease of understanding shows the tubular from $40_2$ supported on the mandrel, the supported tubular form is then passed by way of the die 44 which gauges the outside diameter by (if necessary) stretching the components of the wall axially such that they reduce their relative thicknesses when fully enclosed between the die and mandrel; however, at the locations of the trough depressions where the lining material is spaced from the mandrel and the wall is not fully confined by the surfaces of the mandrel and die, irrespective of the extent to which the homogeneous backing metal is elongated by passage through the die the effect is that the overall wall thickness is reduced and the effective depth of each trough depression is reduced as the interdepression wall thickness is reduced.

Therefore, for a particular batch of tubular bushes manufactured from the same strip of material by the same apparatus, a sample number of bushes so formed may be examined and measured as to their outside diameters and wall thicknesses, and the extent to which the overall wall thickness and any depression in it is likely to be adjusted by the die may be ascertained and taken into consideration when determining the depth to which the trough depressions are initially pressed in the blank in order to produce a gauged bush form that has trough depressions of the desired depth in relation to the wall thickness thereof.

FIG. 2(e) shows the bush $40_1$ mounted in a housing 16 to comprise bearing arrangement $10_1$ with the trough depressions $64_1$ extending axially of the bush, and FIG. 2(f) shows a similar sectional elevation through bearing arrangement $10_2$ formed by mounting in housing 16 the bush $40_2$ with the trough depressions $64_2$ extending circumferentially around the internal surface of the bush. FIG. 2(f) also illustrates a common variant of having a radially extending flange 66 defined by outwardly deforming one end of the tubular bush form (and also referred to hereinafter). Conveniently, the region of the blank destined to form the flange does not have the depressions formed in the surface thereof.

FIG. 2(g) illustrates schematically a fragment of the side wall $42_2$ of the bush $40_2$ greatly enlarged and illustrating the nature of the profiled ISB lining 20, that is, the sponge-like bronze sinter $20_1$, filled polymer $20_2$ infiltrating the interstices between the sintered bronze particles and forming a thin low-friction skin or overlay $20_3$ at the surface and depression $64_2$. In particular the Figure illustrates that as a consequence of pressing the depressions, the lining, that is the bronze sinter underlying each depression and the polymer skin is compressed and consolidated with a reduced volume of interstices infiltrated with the filled polymer, but, as mentioned above care is taken not to compress it by more than about 25% of its initial thickness.

The orientation of trough depressions $64_2$ within the tubular bush form of FIGS. 2(d) and 2(f) is particularly suited for describing a final burnishing operation with reference to FIG. 2(h). The burnishing is similar to that described with reference to FIG. 1(f), and corresponding reference numerals are used, except for the presence at the internal bush surface of the trough depressions $64_2$ and a burnishing tool $50_1$ has a cylindrical part $51_1$ of slightly smaller cylindrical diameter than burnishing tool $50$.

For a bush having manufactured internal diameter of nominally 20.00 mm, and thus a distribution in mounted internal diameter in a range $ID_{MIN}$ to $ID_{MAX}$ (=$ID_{VAR}$) of 0.050 mm to 0.080 mm that is, 0.050 mm<$ID_{VAR}$<0.080 mm, the trough depressions $64_2$ are formed in the blank $30_2$ so that they have a depth of between 0.030 mm and 0.050 mm in the bush form after any reduction in wall thickness due to gauging the outside diameter in the die, but in any event deviating from this to an amount less than would give rise to the maximum 25% reduction in lining thickness that is considered detrimental to lining behaviour, as considered above.

The burnishing tool $50_1$ is formed with the diameter of the cylindrical part $51_1$ in excess of $ID_{MAX}$ by an amount of 10–30% of $ID_{VAR}$, compared with an excess over $ID_{MAX}$ of 30–50% of $ID_{VAR}$ for the known smooth bore bush. The burnishing tool is driven through the mounted bush form in the usual manner; the effect of the radially compressive force acting by way of the inter-depression lining material and over a relatively short length of bush is to distort the bulk of the porous sinter matrix and filled polymer such that material displaced radially by the burnishing tool body is accommodated in part by filling the adjacent trough depression overlain by the burnishing tool body, and only after such trough depression is filled and the bush becomes effectively smooth bore again, does continued radial compression result in the conventional burnishing and any elongation or drawing of the whole bush wall, that is, proportional thinning of the lining and backing with its increased energy input demand.

It will be seen that by choosing a burnishing tool having a cylindrical diameter, in excess of $ID_{MAX}$, that is not significantly greater than the product of the trough depression depth and proportion of lining surface that is depressed, then the volume of inter-depression material displaced should equal the volume of depression left available by the tool without having to deform the backing strip, and so that after passage of the tool the lining surface is smooth with no vestiges of the depressions. However, it will be appreciated that for bushes on which the internal diameter is less that $ID_{MAX}$, and this should be nearly all of them, the diameter of the burnishing tool will exceed that which exactly fills the depressions and an overall reduction in wall thickness by drawing of component parts will be necessary, but to a significantly lesser extent than for a smooth bore bush with the same distribution of inside diameters and requiring a lower total energy input to push the burnishing tool through the bush. Notwithstanding the varying energy requirements which may exist from bush to bush, in each case burnishing a particular bush requires less energy that if it were formed with a smooth bore. Furthermore because there is less overall compression of the whole wall, with correspondingly less recovery and less need to impart an initially high deflection to compensate for such recovery, not only does it permit a smaller diameter (less oversized) burnishing tool and less effort to drive it through the bush, the reduced extent of wall thickness recovery is more predictable and means that the final wall thickness can be finished with improved accuracy for a particular burnishing tool diameter. Thus the variation in internal diameters of the burnished bush $ID_{BVAR}$ can be improved, not only to the extent that the tolerances of the housing are eliminated but also reduced below the variations found in a newly manufactured bush before mounting in a housing.

By way of example, for a sample number of bearing arrangements made from the bushes having inside diameters in the range 20.00 to 20.05 mm and trough depressions pressed individually to a depth of 0.050 mm, the burnishing tool $50_1$ had a diameter of its cylindrical part of 20.05 mm (that is, exceeding $ID_{MAX}$ by 20% of $ID_{VAR}$) and produced variations in the inside diameters in the range 20.045 to 20.055 mm, that is, $ID_{BVAR}$ of 0.01 mm.

The fact that the inside diameter of the bush can be defined in part without radial compressive displacement of the lining material and then to the extent necessary to compensate for significant recovery of wall thickness, makes it possible, by burnishing, to increase the internal diameter of the bush to a greater extent than for a smooth bore bush by a suitably dimensioned burnishing tool. Viewed simply, when the inside diameter of the bush bearing is to be increased to a particular size in excess of that normally achievable with a smooth bore bush (when the energy input required exceeds a level at which the filled polymer begins to shear) the correspondingly larger burnishing tool effects the initial increase in bore, that is, reduction in overall wall thickness, by the redistribution of lining material with little energy input is then able to effect the remaining decrease in overall wall thickness by elongation of the bush to the limit of the aforesaid maximum energy input. It is found that when the enlargement of the inside diameter is small and little deformation of the (relatively elastic) backing strip is required, the small amount of wall thickness recovery gives a small distribution $ID_{BVAR}$ of inside diameters: as greater reduction in wall thickness is required and recovery becomes more pronounced the distribution of $ID_{BVAR}$ increases, but tends to peak and then diminish as the percentage wall elongation increases. Therefore it may be possible not only to increase the inside diameter of a mounted bush to a greater extent by burnishing than has hitherto been possible, but also that such greater increases are achievable with little or even negative detriment to the distribution of diameters.

When simply reducing the distribution in inside diameter values, the relative ease with which the smaller diameter burnishing tool is driven through the mounted bush reflects the lower radial forces exerted by way of the bush wall on the housing and this provide an ability to burnish such bushes within a weaker housing than hitherto or at least with less risk of housing damage/greater margin of safety.

It will be understood that if it is acceptable to have vestigial depressions, possibly to serve as breathing conduits or lubricant holding pockets, then the trough depressions may be made deeper and/or wider in relation to inter-depression surface for a particular burnishing tool diameter or, conversely, the burnishing tool may take cylindrical diameter less in excess of $ID_{MAX}$.

It is found that the direction of the trough depressions does not significantly affect the force necessary to drive the burnishing tool through the bush nor the accuracy of dimensions achieved. To this end trough depressions may be directed other than along or orthogonal to the longitudinal axis of the bush, such as being skewed. Furthermore they need not be parallel to each other nor of equal dimensions and more than one set of intersecting troughs may be employed. It is believed preferable that the troughs extend between edges of the blank/bush bore to avoid regions where the bush wall is of constant thickness (as in the known smooth bore form) without providing a local region to receive displaced material. But this is not considered essential on present knowledge. For example such troughs may be spaced from the edges of the blank but joined to each other in a serpentine manner. Alternatively, the depressions may be arrayed other than as elongate troughs and be disposed as a two dimensional array of individually more limited depressions.

As indicated at above the depressions may be formed with different spacings and/or dimensions as appropriate for the size of bush and thickness of IBS material, provided the depressed area is less than the non-depressed area and there are no sharp corners that may promote shearing of the lining material after passage of the burnishing tool, and the initially flat surface may be made to have continuously rounded corrugations as a result of pressing trough like depressions.

It will be appreciated that although the above description has concentrated upon a backed infiltrated sintered bronze material it is applicable to any bush in which the wall has a lining that behaves in an analogous manner with or without a backing, that is, responds to the compression of radial burnishing pressure by some plastic thinning of the wall with or without relaxation, and has a filled polymer lining surface and/or structure not amenable to techniques such as reaming which remove material.

It will be appreciated that the depressions may be pressed into the bearing lining by other than pressing a substantially flat blank, for example by passing the stock strip (or blank) through rollers, one of which indents the IBS lining face, or by providing a profiled surface to the mandrel against which the tubular form is defined, as illustrated in FIG. 2(i) in which the mandrel 32' has arrayed about its periphery a series of projections $32'_1$ which each project to an extent that is slightly in excess of the pre-determined depth desired for the elongate troughs and against which the ISB lining face 20 of the strip is pressed in defining the tubular form.

As a alternative to forming the indentations as elongate troughs whilst the bush material is in the form of a laminar strip and prior to bending into tubular form, depressions in the form of elongate troughs may be formed in the bearing surface of the tubular form after it is mounted in a radially supporting housing and prior to burnishing.

Referring to FIGS. 3(a) and 3(b), a depressing tool 100 is shown in cross sectional and sectional elevation respectively. The tool is similar to the above described burnishing tool in having a bi-conical tapered end region 101, 102 and a relatively short central cylindrical region 103. The cylindrical region 103 has a diameter that is substantially the same as the undersized mounted bush form and has arrayed about its periphery a series of projections 104 which each project to an extent that is slightly in excess of the pre-determined depth desired for the elongate troughs. The projections are rounded, at least in one axial direction, and conveniently in all directions, such as part spherical.

In forming a mounted bearing by a method employing this tool the bush 110 is formed with plane internal lining walls 111 and in the manner of FIGS. 1(a) to 1(e).

The depressing tool 100 is then pushed through the mounted bush form in an axial direction, and conveniently reciprocally, such that the projections 104 compress the lining by the passage effecting a local, possibly aggressive burnishing action, and define elongate troughs 112. As discussed above the lining material may effect a degree of recovery after compression by the compressing tool passage and in dependence upon the behaviour characteristics of the lining the tool projections are dimensioned to provide, after any such recovery, the desired trough dimensions.

The mounted, and now indented, bush form is thereafter subjected to burnishing by the burnishing tool $50_1$ described above with reference to FIG. 2, having the uniformly cylindrical central portion of less than conventional diameter.

It will be appreciated that in forming elongate troughs by such a depressing tool, the tool may be moved axially whilst being rotated about its longitudinal axis in order to produce helically skewed troughs, or even oscillated about the axis to produce 'wavy' troughs, and it may be subjected to such rotational motion with reciprocal axial motion to define intersecting troughs.

A modification of the above trough defining depressing tool 100 and thus the method which employs it, is illustrated in FIG. 4 in which it forms part of a flanging tool 200 for forming a flange at one end of a tubular bush form (similar to the flange 66 of the bush form $40_2$ of FIG. 2(f).)

The flanging tool 200 is symmetrical about a longitudinal axis 201 and is reciprocable therealong by means of a hydraulic ram (not shown). The tool has a longitudinally extending guide spigot part 202, dimensioned to pass through a bush form 205 mounted in a die 206 which supports it radially except for an end region 207, and a shoulder part 208 adapted to splay the upstanding and unsupported region 207 of the bush form and deform it to lie flat against the die as a radial flange, shown ghosted at $207^1$. The flanging tool and flange-forming operation are essentially conventional except insofar as the spigot part 202 has its diameter identical with, the above described compressing tool 100 and carries projections 210. Thus, depending upon the precise disposition of the projections along the length of the guide spigot part, the operation of forming the flange is immediately preceded by, or contemporaneous with, the formation of elongate troughs. It will be appreciated that in passing the compressing tool through the unsupported region 207, deflection of the wall may mitigate the formation of depressions. However, even if such trough depressions are formed thereat, the pressure exerted thereon in forming the flange applies compressive forces to the whole surface of that region of such magnitude as to effectively eliminate all traces of the troughs from the flange surface, which may be employed as a thrust bearing.

It will be appreciated that the methods described with reference to FIGS. 3 and 4, and employing a depressing tool passed through the tubular bush form, are applicable in respect of not only circumferentially discontinuous bush, that is, one bent from a laminar blank, but also a circumferentially continuous bush in which the lining has been defined in the tubular form in the first instance.

Also, it is reiterated that the bush form mounted in a housing may, after burnishing be removed and split lengthways to form bearing shells, or the bush mounted in the housing before burnishing may comprise discrete semi-cylindrical shells.

Whereas the above description has concentrated upon the provision of a circularly sectioned lining bearing having a filled polymer compressible lining, wherein the lining has an array of compression depressions prior to burnishing, and possibly prior to defining the tubular form, the laminer bearing material per se, may, as a stock material in strip form, have a minor part of the lining provided with an array of depressions by compression of the lining.

What is claimed is:

1. A method of making a circularly sectioned bearing having a radially supported filled polymer compressible lining comprising the steps of:

(i) defining a tubular form of which the filled polymer compressible lining presents a bearing surface extending about, and facing inwardly towards, a longitudinal axis, having an internal diameter $ID_{MAX}$ smaller than the desired internal diameter of the bearing and having an axial length;

(ii) mounting the tubular form in a radially restraining housing to define a mounted form, and (iii) increasing the internal diameter of the mounted form to said desired internal diameter by passing therethrough a burnishing tool having a cylindrical portion of length less than said axial length of the tubular form and a diameter in excess of the desired internal diameter of the bearing and operable to effect by said passage compression of the filled polymer compressible lining in a direction substantially perpendicular to the surface, the method being characterised by the steps of, prior to the passage of said burnishing tool through the mounted bush form, effecting at least a partial compression of a minor part of the area of the filled polymer compressible lining as a plurality of depressions in said bearing surface of the mounted tubular form, the depressions being distributed over the surface and having a depth of less than 25% of the thickness of the filled polymer compressible lining.

2. A method as claimed in claim 1 characterised by determining the variations in internal diameter of the bearing due to tolerances in manufacture and mounting of the mounted form, and passing through the mounted form including said bearing surface depressions said burnishing tool having a cylindrical portion of diameter in excess of the desired internal diameter of the bearing by a percentage of said tolerance variations in the range 10% to 30%.

3. A method as claimed in claim 1 characterised by effecting said depressions as elongate troughs.

4. A method as claimed in claim 3 characterised by forming at least some of said elongate troughs extending to an edge of the tubular form.

5. A method as claimed in claim 3, characterised by forming said elongate troughs discrete from, and substantially uniformly spaced from, each other.

6. A method as claimed in claim 5 characterised by forming said elongate troughs individually having a width in the range 40% to 70% of the distance between adjacent troughs.

7. A method as claimed in claim 3 characterised by forming said troughs to a depth in the range 0.035 to 0.045 mm with respect to the undepressed surface.

8. A method as claimed in claim 3 characterised by forming said troughs such that they are elongate in a direction substantially along the longitudinal axis of the tubular form.

9. A method as claimed in claim 8 characterised by effecting said elongate trough depressions by passing through the mounted tubular bush form a cylindrical depressing tool having surface projections corresponding to said depressions.

10. A method as claimed in claim 1 characterised by forming said depressions to a depth in the range 0.025 to 0.055 mm with respect to the undepressed surface.

11. A method as claimed in claim 1 characterised by defining the tubular form by disposing a predetermined length of laminar bearing strip material, having at least one surface of said filled polymer compressible lining, with said lining surface against a mandrel and bending the strip about the mandrel, and being characterised by effecting said plurality of depressions by applying pressure to said filled polymer compressible lining surface of the strip prior to disposing it against the mandrel.

12. A method as claimed in claim 11 characterised by forming said depressions by clamping the laminar strip between a profiled embossment surface and an unprofiled support surface.

13. A method as claimed in claim 12 characterised by effecting said embossment clamping simultaneously with cropping said predetermined length from the end of bearing strip material stock.

14. A method as claimed in claim 1 characterised by defining the tubular form by disposing a predetermined length of laminar bearing strip material, having at least one surface of said filled polymer compressible lining, with said surface against a mandrel and bending the strip about the mandrel, and being characterised by effecting said plurality of depressions by applying pressure to said compressible filled polymer bearing surface against projections of a profiled surface of the mandrel.

15. A method as claimed in claim 1 characterised by forming said depressions to define by their depths a notional tubular diameter less than the diameter of the burnishing tool.

16. A method as claimed in claim 1 characterised by forming said depressions such that the total volume of filled polymer compressible lining displaced thereby is substantially equal to the volume of filled polymer compressible lining representing the diameter undersize of the mounted tubular form prior to said passage of the burnishing tool.

17. A method as claimed in claim 1 characterised by radiussing any corners associated with the depressions to mitigate shearing of components of the filled polymer compressible lining by passage of the burnishing tool.

18. A method as claimed in claim 1 characterised by forming the filled polymer compressible lining of sintered bronze infiltrated with filled polymer.

* * * * *